United States Patent [19]

Sheu

[11] Patent Number: 5,542,209

[45] Date of Patent: Aug. 6, 1996

[54] STALK SUPPORT FOR FLOWERS

[76] Inventor: Shyong-Shyy Sheu, Suite 1, 11F. No. 95-8 Chang Ping Rd. Sec. 1, Taichung, Taiwan

[21] Appl. No.: 177,276

[22] Filed: Jan. 4, 1994

[51] Int. Cl.⁶ ........................................ A01G 17/06
[52] U.S. Cl. ............................. 47/44; 24/489; 24/339
[58] Field of Search .................. 47/44 L; 24/489, 24/339

[56] References Cited

U.S. PATENT DOCUMENTS

| | | | |
|---|---|---|---|
| 817,201 | 4/1906 | Strum | 24/489 |
| 2,885,758 | 5/1959 | Russo | 47/44 L |
| 3,203,061 | 8/1965 | Thomas | 24/339 |
| 3,349,453 | 10/1967 | Chiyoichi | 24/489 |
| 5,052,086 | 10/1991 | Nasuno | 47/44 L |

FOREIGN PATENT DOCUMENTS

| 5003728 | 1/1993 | Japan | 47/44 L |
|---|---|---|---|

*Primary Examiner*—Henry E. Raduazo

[57] ABSTRACT

A stalk support for flowers comprises generally a roughly R shaped clamp displaceably attached to a cylindrical rod thereon. The clamp is made from a flexible plastic material having a roughly hoop clasp with a pair of spaced legs parallel extended outward at a rear periphery therefrom, a slotted opening formed on an opposing periphery of the hoop clasp, three circular finger contacts formed respectively at the free ends of the two legs and the arcuate arm of the clasp thereon and a cylindrical sleeve connected perpendicularly to the free end of a straight arm of the hoop clasp therewith so as to define a roughly circular space to receive a peduncle of the flower therein. An alterative embodiment provides an openable sleeve that facilitates a ready attachment of the clamp to a rod thereon. Another embodiment provides a sealed sleeve that suitable for attaching to the top of a rod in different diameter.

5 Claims, 7 Drawing Sheets

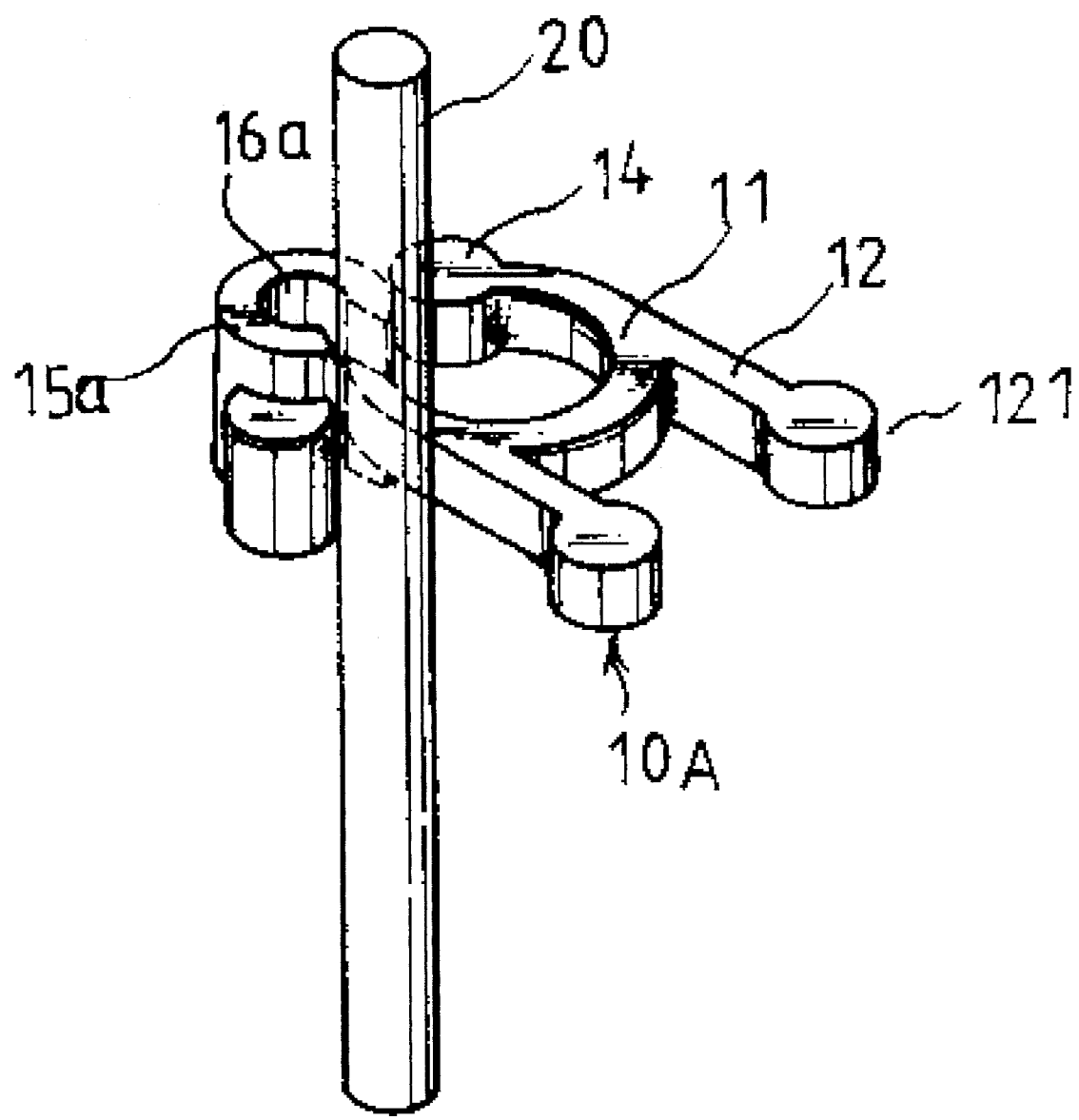
F I G. 5

A-A

5,542,209

STALK SUPPORT FOR FLOWERS

BACKGROUND OF THE INVENTION

The present invention relates to gardening apparatus, more particularly to a stalk support for flowers which is integrally made from flexible plastic material in simple structure for providing greater convenience to the users on their gardening affairs.

To plant flowers in a garden, a potted plant in particular needs in accompanied with a stalk support for example because the peduncles of the flower are breakable or easily bending down along with the blooming of the flowers.

Conventionally, people employ a straight article such as a rod planted abutting the root of a flower and adapt an ordinary clip or a piece of iron wire to fix or wind the peduncle along with the rod in order maintaining the peduncle to be grown upright. However, this method is too crude, uneconomical and awkward at all.

Another exemplar employs a support having a straight portion and a hoop formed at one end thereof for receiving a peduncle of flower therein when it is plented on the other end abutting the flower, but it has been proved substantially unstable and sometimes assisted by winding a piece of iron wire that causes a labor consumption.

SUMMARY OF THE PRESENT INVENTION

The present invention has a principal object to provide a stalk support which is integrally formed of flexible plastic material in simplized form and fine appearance can be readily applied and inexpensively to manufacture.

Accordingly, the present invention of a stalk support for flowers comprises a roughly R shaped clamp adapted for attaching a flower to a cylindrical rod thereon.

The clamp includes two similar examples. The first one comprises a roughly closed hoop clasp formed by a pair arms having adjacent ends, a pair of legs extended spacedly parallel at a rear periphery therefrom and a slotted opening on the fore periphary thereof defining a roughly circular receiving space for receiving a cylinder rod therein, a sleeve formed at the opening and perpendicularly connected to a roughly straight arm of the hoop clasp and three circular finger contacts formed at the free ends of the legs and the arched arm of the hoop clasp abutting the opening respectively.

A second example of the clamp is mostly equal to the first equivalent in every detail, except a slotted opening is formed on an outer periphery of the sleeve in addition to a cam finger contact formed adjacent the opening.

In a third example provides a longer sleeve instead of the above recited sleeves, which has a sealed upper end and a stepped inner surface is suitable to attach to the top of a rod in different diameter.

In practice, at least one clamp is displaceably telescoped onto the rod through the sleeve prior to that the rod plants abutting a peduncle of the flower, then press the finger contacts of the two legs to have the slotted opening on the hoop body to be resiliently apart and wider enough to receive a peduncle therein.

The second example of the clamp of the present invention can be applied firstly either to the peduncle or to the rod that provides greater convenience to the user.

The present invention will be fully understood by reference to the following detailed description thereof when read in accompaying with the attached drawings.

BRIEF DESCRIPTION OF THE DRAWINGS

FIG. 5 is a perspective view to show a clamp of the alterative embodiment being attached to a rod.

DETAIL DESCRIPTION OF THE PREFERRED EMBODIMENT OF THE PRESENT INVENTION

Figure 1:
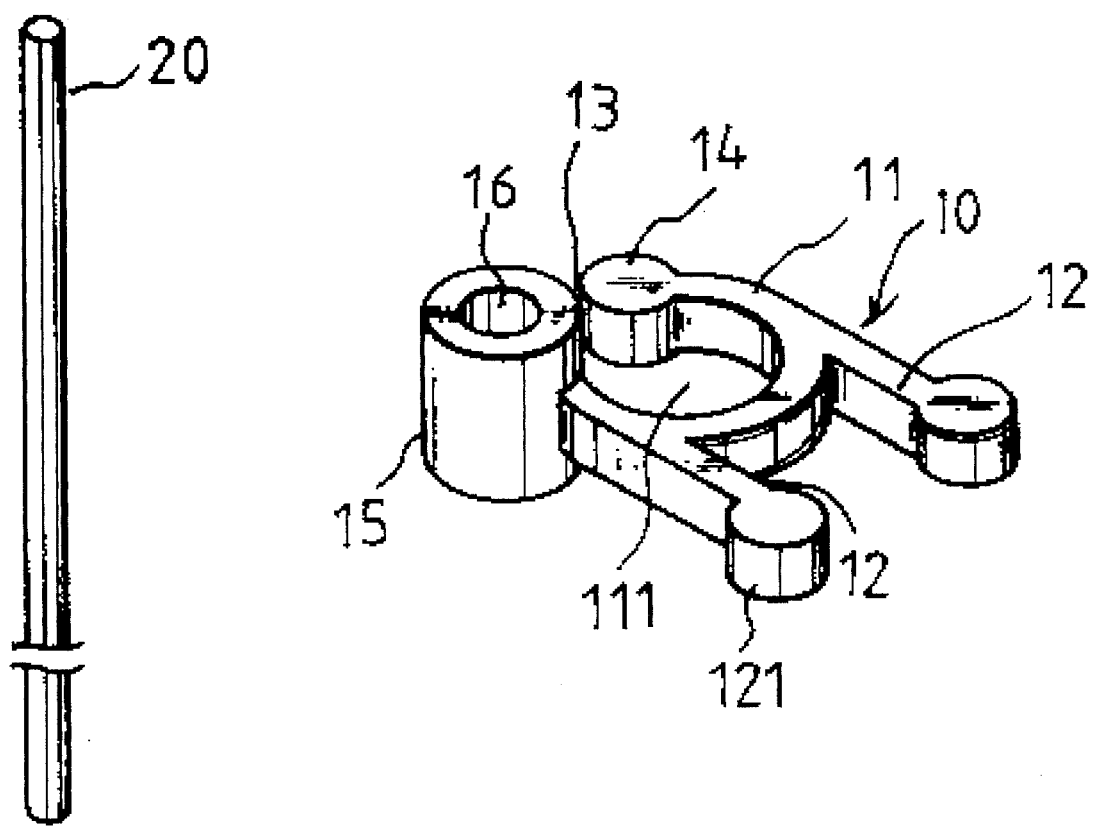
FIG. 1 is a perspective view to show a preferred embodiment of the present invention.
Figure 2:
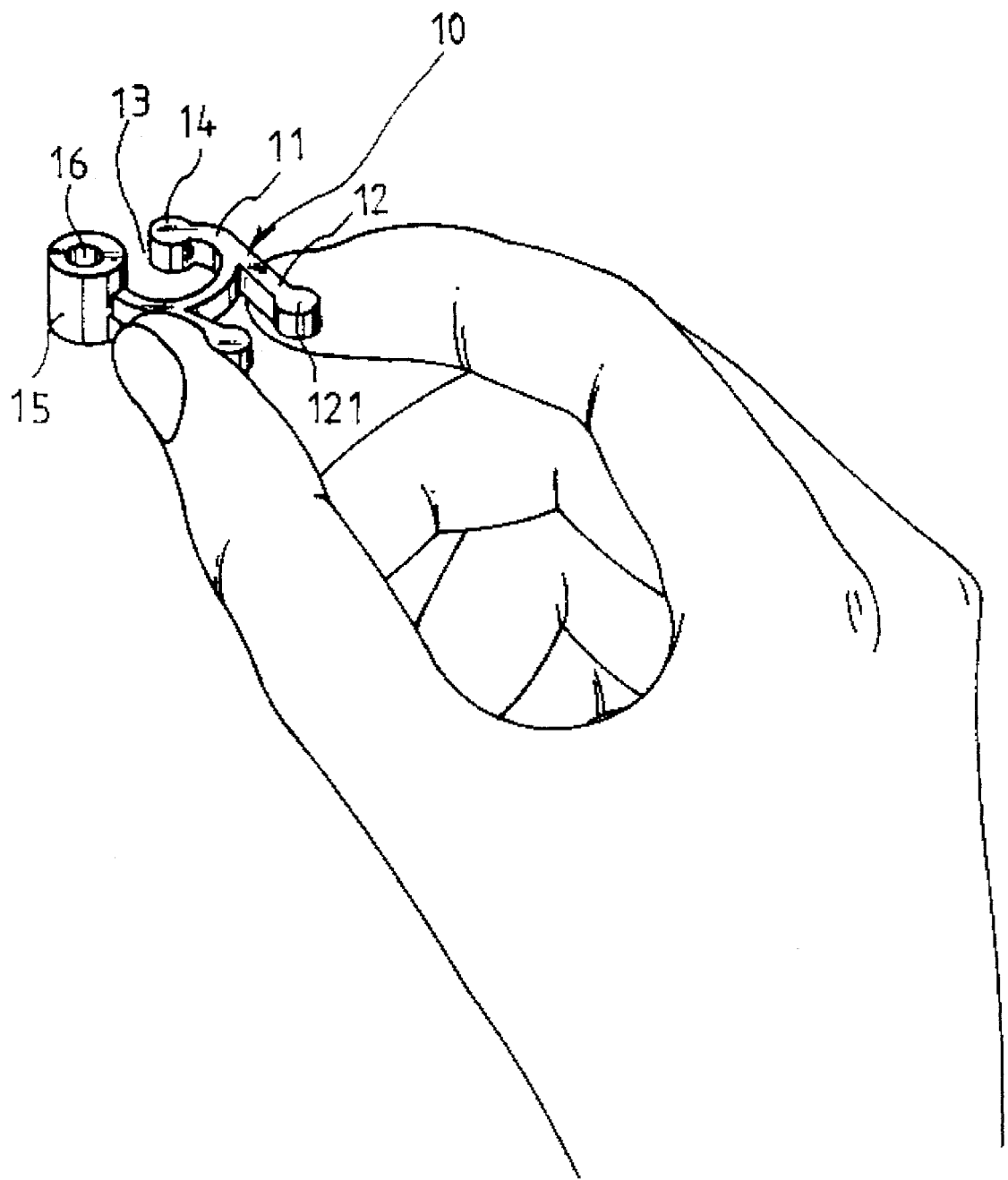
FIG. 2 is a perspective view to show a preferred embodiment of the present invention being pressed by fingers.

With reference to FIGS. 1 and 2 of the drawings, the present invention of a stalk support for flowers comprises a roughly R shaped clamp adapted for attaching a flower to a cylindrical rod 20 thereof.

The clamp 10 comprises a roughly closed hoop clasp 11 having a pair of spaced legs 12 parallel extended outward at a rear periphery therefrom, a slotted opening 13 formed on the fore periphery of the hoop clasp, a pair of circular finger contacts 121 formed at the free end of the legs 12, a circular finger contact 14 formed at the end of the arcuate arm of the hoop clasp 11 and a cylindrical sleeve 15 formed adjacent the opening 13 and connected perpendicularly to the end of the straight arm of the hoop clasp 11 so as to define a roughly circular receiving space 111 therein. The sleeve has been centrally formed an axle aperture 16 for displaceably telescoping onto the cylindrical rod 20.

Figure 3:
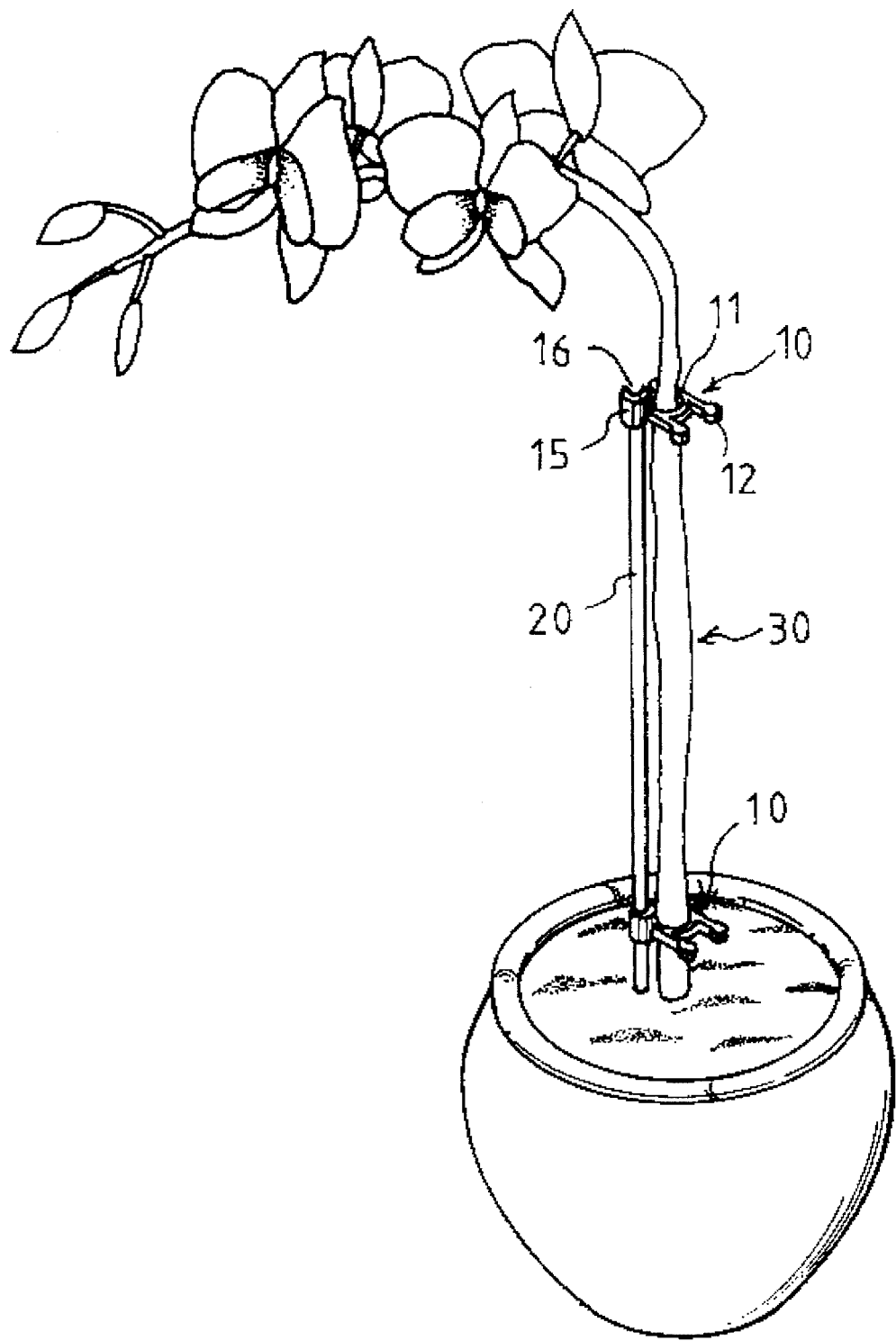
FIG. 3 is a perspective view to show a preferred embodiment of the present invention being applied to a potted flower.

Referring to FIG. 2, indicating an application of the clamp 10 of the present invention, since the clamp is made in integral from flexible plastic material, a slight pressure applied to the finger contacts 121 will leverly expand the slotted opening 13 to a certain extent, in addition to the arcuate surface of the finger contact 14 and the sleeve 15, a peduncle is readily enters the receiving space 111 therein. FIG. 3 shows a proper application of a stalk support, of the present invention to a potted flower. At least one clamp 10 previously sleeves to the rod 20 thereon as it plants abutting a peduncle 30 of the flower, then displace the clamp about the outer periphery of the rod and clamp the peduncle 30 therein at a suitable position.

Figure 4:
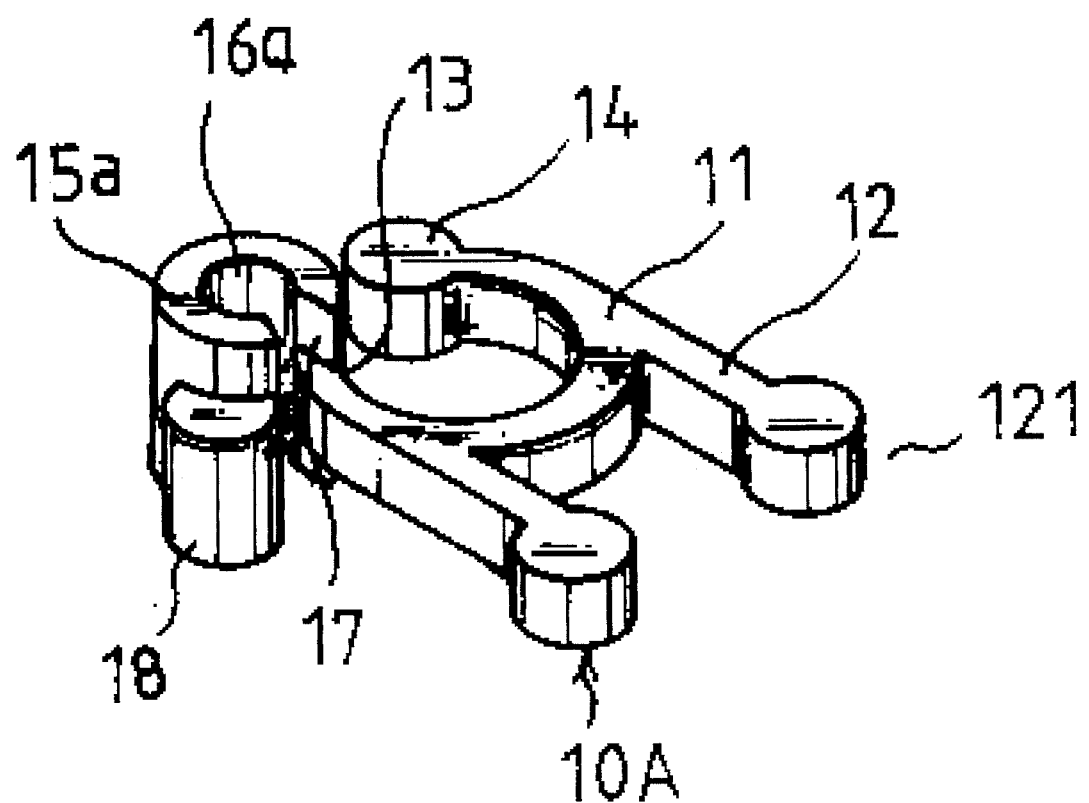
FIG. 4 is a perspective view to show an alterative embodiment of the present invention.

With reference to FIGS. 4 and 5, an alterative embodiment shows a clamp 10A comprising a roughly hoop clasp 11, having a pair of spaced legs 12 extended outward at a rear periphery therefrom, an slotted opening 13 formed on the fore periphery of the hoop clasp, a pair of circular finger contacts 121 formed at the free end of the legs 12 and a circular finger contact 14 formed at the end of the arcuate arm of the hoop clasp 11. Generally, most features of this embodiment are as those recited in the first embodiment, the only different is of a cylindrical sleeve 15a which has also a centrally formed cylindrical aperture 16, but a slotted opening 17 adjacent a finger contact 18 are formed abutting the outer periphery of the hoop clasp 11. This improvement provides an advantage to that the rod 20 can squeeze to the sleeve therein without telescoping and that the clamp 10A can be applied previously to or later on the planting of the rod 20.

Figure 6:
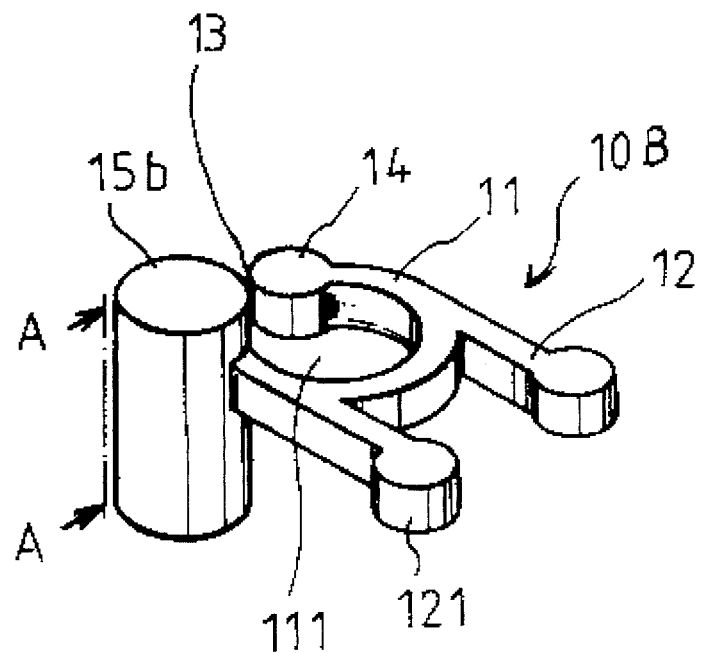
FIG. 6 is a perspective view to show another alterative embodiment of the present invention.
Figure 6A:
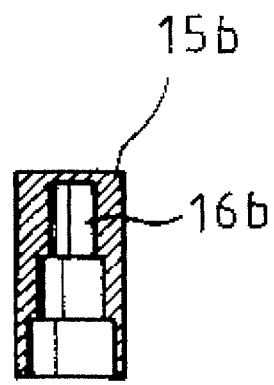
FIG. 6A is a sectional view taken along A—A of FIG. 6, and, FIG. 7 is a perspective view to show the alterative embodiments of the present invention being applied to a potted flower.

Referring to FIG. 6, another alterative embodiment shows a clamp 10B having a longer sleeve 15b perpendicularly formed at the end of the straight arm instead of the sleeves 15 or 15a in above embodiment which sleeve 15b has a sealed top end and a stepped inner surface 16b suitable for attaching to the top of a rod 20 in different diameter.

Figure 7:
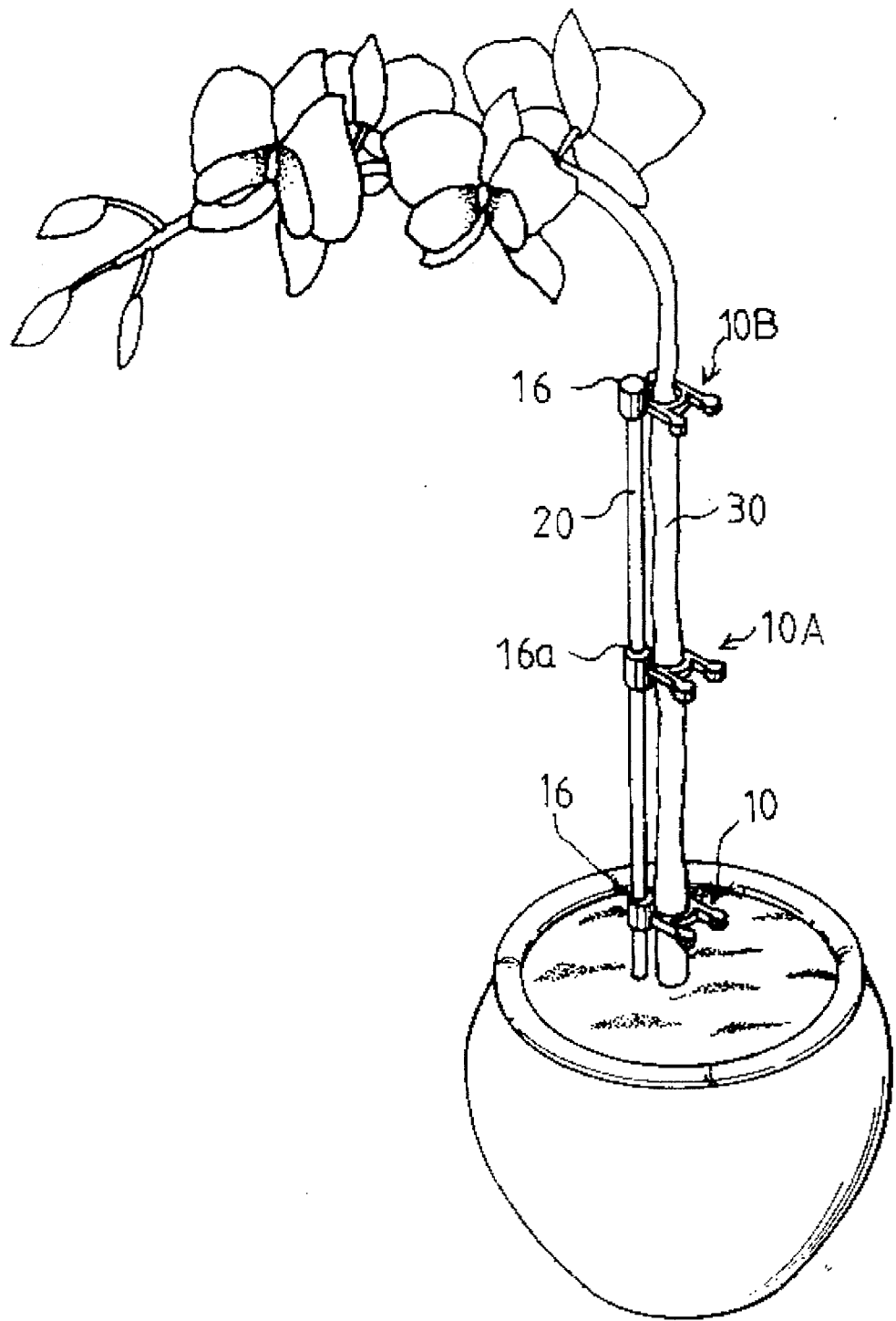

However, either of the clamp 10, the clamp 10A or the clamp 10B can be applied solely or collectively, singly or plurally, yet the latest is rather used for compensatory purpose than the formers at later stage. FIG. 7 indicates a collective application of the clamps 10 and 10A to a potted flower.

Based on the structural improvement recited above, the present invention of a stalk support for flowers provides numerous features and advantages outlined as follows:

a) it provides a simplized structure of clamp for readily applying to a peduncle of the flower.

b) it can be displaceable along the outer periphery of the rod so as to facilitate pinpointing a suitable position thereon, c) it can be applied solely or collectively, singly or plurally to a rod, and d) because of the material flexibility, the clamp applied to the peduncle will not impede or mar the growth of the flower.

Although the description above contains many specificities, these should not be construed an limiting the scope of the invention but as merely providing illustrations of the same of the presently preferred embodiment of this invention. Thus the scope of the invention should be determined by the appended claims and their legal equivalents, rather than by the examples given.

I claim:

1. A stalk support for flowers comprising an integrally formed clamp adapted for attaching a flower to a rod member, said clamp comprising a roughly R-shaped body formed of resilient material and having a closed loop clasp portion formed by a pair of arms having adjacent ends, one of said arms including a cylindrical sleeve portion adapted to receive said rod member in a longitudinally displaceable manner adjacent it's respective end, and the other of said arms being resiliently displaceable relative to said first arm to receive the peduncle or stem of a plant, said clamp further including a pair of legs extending from said closed loop at spaced locations roughly opposite said adjacent ends whereby squeezing said legs will cause the ends of said arms to move resiliently apart to receive and hold said peduncle.

2. The clamp of claim 1 wherein said legs are provided with a circular finger contact portion.

3. The clamp of claim 1 wherein said resilient material is plastic.

4. The clamp of claim 1 wherein said cylindrical sleeve includes a slotted opening and a circular cam surface for receiving said rod member.

5. The clamp of claim 1 wherein said cylindrical sleeve has a stepped interior surface adapted to receive rods of different sizes.

* * * * *